Feb. 1, 1966

R. VAN EPS 3,232,625

PHONOGRAPH PICK-UP ARM

Filed Jan. 2, 1962

2 Sheets-Sheet 1

INVENTOR,
ROBERT VAN EPS;

BY

Calvin Brown,

ATTORNEY

INVENTOR,
ROBERT VAN EPS;
BY [signature]
ATTORNEY

United States Patent Office 3,232,625

Patented Feb. 1, 1966

3,232,625

PHONOGRAPH PICK-UP ARM

Robert Van Eps, 1618 El Rito Ave., Glendale, Calif.

Filed Jan. 2, 1962, Ser. No. 163,425
3 Claims. (Cl. 274—23)

The present invention relates to dual compensating phonograph pick-up arms for disc records wherein the stylus head carried by the arms will, while traversing the spiral grooves of a disc record, at all times be maintained tangent to the sound groove or track.

Tracking error is a problem in the playing of disc type phonograph records. Tracking error introduces wear on the phonograph record, and, in addition, causes faulty reproduction such as sound distortion and generation of noise. Tracking error is particularly objectionable and noticeable when so-called Monaural and Stereophonic types of records are played. The modern hi-fidelity recordings with micro grooves introduce problems in reproduction by a reproducer. Tracking pressure is important, and it often happens that tracking pressure is either too heavy or too light which causes faulty reproduction or damage to the record groove in that if the tracking pressure is too light the reproducer stylus will jump grooves, particularly due to torque influence.

An object of my invention is to reduce tracking error to substantially zero and to provide a stylus head wherein the stylus is maintained tangent to the record groove or track and throughout the length of the track at the point of contact.

A further object is to provide phonograph pick-up arms including a stylus head wherein the pick-up arms have no tendency to move under torque influence. With respect to this object, it may be pointed out that conventional phonograph arms have a tendency to pull toward the turntable center whereas with my invention the arms have no tendency to pull in any direction.

A further object is the provision of phonograph pick-up arms including a stylus head which permits tracking pressure to be adjusted without track skating.

A further object is to provide phonograph pick-up arms including a stylus head which completely eliminates "needle talk" and fluttering to the end that any sympathetic tonal reactions are eliminated.

A further object is the provision of means whereby stereoelectrical and mechanical phasing is correct and all twisting and tilting of the stylus head is eliminated.

A further object is the provision of phonograph arms and stylus head therefor for the playing of disk type records which will reproduce the frequencies in the record tracks or grooves in all ranges, in equal quality and clearness, and without any sounds being omitted.

Other objects include phonograph pick-up arms, including a stylus head, which while playing a record will do so with brilliance, hi-fidelity, stereo balance, wherein friction and wear are reduced, and mass inertia improved.

The present phonograph pick-up arms are sturdy, reliable, perform the function required with efficiency, do not introduce into the structure complicated moving devices in order to maintain the stylus tangent to the record groove or track, simple of structure, and adapted to function without attention over long duration of time. The inventor is aware that investigators into the art of phonograph arms have endeavored in the past to accomplish some of the objects of the present invention such as maintaining the reproducer so that the stylus head is at right angles or tangent to the record groove during a playing of the record. In every instance, so far as the inventor is aware, these investigators have introduced various complicated structures such as cams, various lazy tong types of linkage and other types of compensating means for this purpose. Such instrumentalities introduce errors particularly in tracking, and also introduce a torque influence, adding to track wear and track pressure and thereby introducing extraneous noises and a lack of fidelity. My invention overcomes these defects with a structure which is simple, inexpensive and superior.

Figure 1:
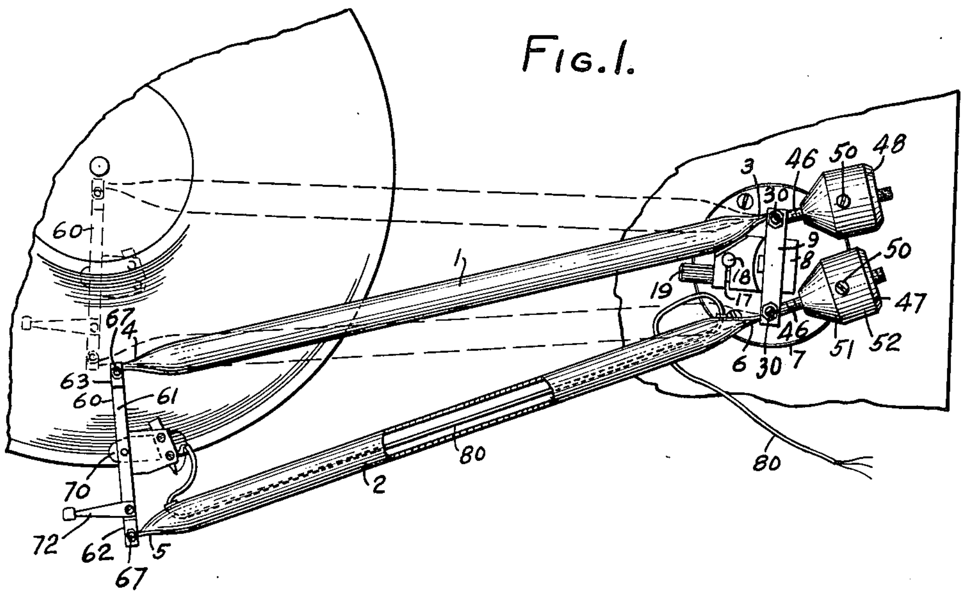
FIGURE 1 is a fragmentary, top plan view of a disc record showing the improved phonograph pick-up arms of the invention.
Figure 2:
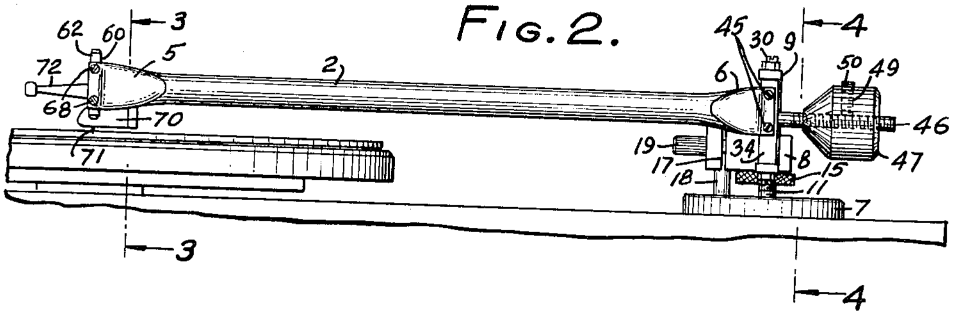
FIGURE 2 is a fragmentary, side elevation of the record turntable with a record thereon, and the pick-up arms of the invention.

Referring now to the drawings, I provide a pair of pick-up arms 1 and 2 of equal length and preferably formed from a light metal tubing such as aluminum. Both arms are of the same length and the ends 3, 4, 5, and 6 are flattened with the flattened ends 3 and 4 and 5 and 6 lying in the same plane cutting the axis of each arm. As is usual practice in phonograph pick-up arms, a cantilever construction is utilized wherein the arm or arms are supported from one end or ends thereof. In the present instance, I provide a base member 7 which adjustably supports a block 8, FIGURES 4 and 5, the block in turn pivotally supporting a bridge member 9. The block 8 has a smooth vertical bore 10 to receive a screw threaded member 11, one end of member 11 is anchored in the base 7, by portion 12. This anchoring may be accomplished in any desired manner, and in the present instance the base is transversely bored and counterbored at 13 and 14 to receive the head and shank of portion 12. An enlarged diameter knurled edge nut 15 is carried on the screw threads of the member 11 and supports block 8 so that a turning of the same will raise or lower the block 8. The block 8 is provided with a vertical bore 16 extending through the block and the block is split vertically at 17, the split leading to the vertical bore 16. A pin or post 18 is secured at one end to the base 7 and extends through the bore 16 for the purpose of guiding movement of the block when the nut 15 is rotated. The block may be clamped or locked at various elevations relative to the base by means of a clamping screw 19 having threaded engagement with a threaded bore 20 which is transverse to the slot 17. Turning the clamp screw in one direction will thereby bind the block to the post 18.

Figure 4:
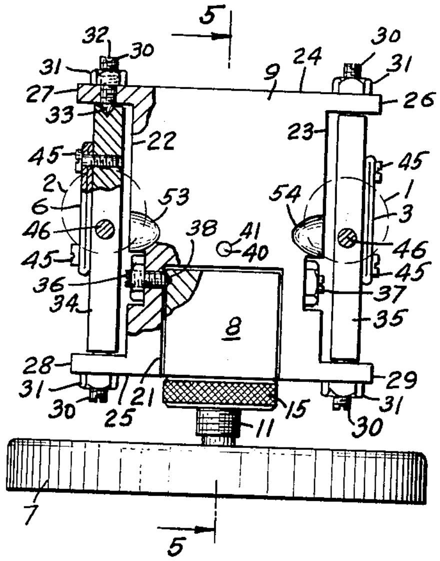
FIGURE 4 is a fragmentary sectional view on the line 4—4 of FIGURE 2, on an enlarged scale.
Figure 5:
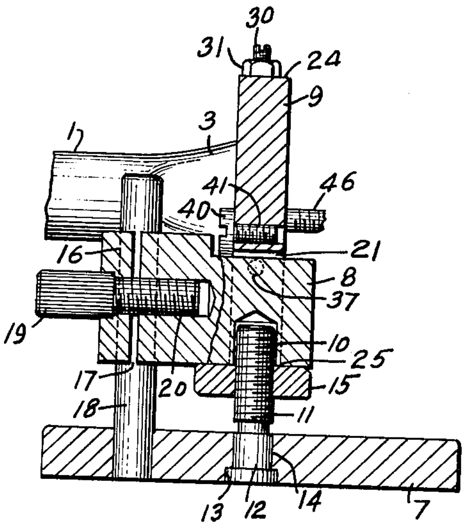
FIGURE 5 is a fragmentary sectional view on the line 5—5 of FIGURE 4.

The bridge member 9 is transversely slotted intermediate the width of said member from the bottom edge thereof, as shown at 21. One end of the block 8 extends through slot 21, as shown in FIGURES 4 and 5.

The bridge 9 has two side edges 22 and 23 which substantially parallel the top and base or bottom edges 24 and 25 which are parallel and in right angular relationship to the side edges 22 and 23. Both the top and bottom edges are provided with aligned pairs of arms which extend beyond the side edges 22 and 23, as shown at 26 and 27 for the top 24, at 28 and 29 for the base or bottom edge 25. The arms 26 to 29, together with the sides 22 and 23, form yokes. The top and bottom arms transversely carry pivot screws designated generally as 30, and each pivot screw is adjustable in that each pivot screw is passed through a screw threaded transverse opening in each arm and held in adjustable position by a lock nut 31, each screw being provided with a kerf 32 for adjustment purposes. As is usual practice, the pivot screw 30 has a conical end 33. The pivot screws for the top and bottom pairs of arms 27 and 28 in one instance, and 26 and 29 in a second instance, lie on the same axis and posts 34 and 35 having conical bearing portions for the tops and bottoms thereof receive the conical ends of the pivot screws.

Each side edge 22 and 23 of the bridge member 9, is provided with a transverse screw threaded bore, which bores are axially aligned and receive pivot screws 36 and 37, having a construction identical with the pivot screws 30 with the conical ends of said screws received in conical bearings 38 of the block 8, and at sides of the block. Thus the bridge member 9 may swing vertically on the pivot screws 36. However, the vertical swing of the bridge 9 is regulated by an adjusting screw 40 which is transversely received in a threaded opening 41 of the bridge member 9, the head of the adjusting screw engaging a stepped portion on the top of the block 8, as shown in FIGURE 5 and acting to limit counterclockwise movement of the bridge member. The flattened ends 3 and 6 of arms 1 and 2 are secured in alignment to the posts 34 and 35 respectively, by screws or other means 45. Each post 34 and 35 is provided with an outstanding elongated screw member 46 and each screw member carries a weight 47 and 48 which is adjustable upon the screws 46. Each weight is diametrically screw threaded at 49 to receive a set screw designed generally as 50, which set screw is adapted to engage the screw 46 to lock the weight against movement on screw 46. The weights may take various forms. In the present instance, each weight has a conical head 51 merging with a cylindrical body 52. Slides 22 and 23 of the bridge member 9 are relieved at 53 and 54, to receive the members 46 when the arms 1 and 2 assume various position, as, for instance, illustrated in FIGURE 1.

Figure 3:
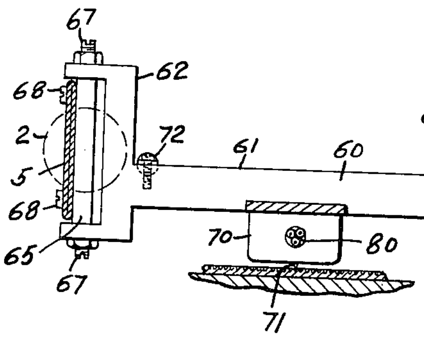
FIGURE 3 is a fragmentary sectional view on the line 3—3 of FIGURE 2, and on an enlarged scale.

The flattened ends 4 and 5 of the arms 1 and 2 are interconnected by a bridge 60 of the form shown in FIGURE 3. Bridge 60 is similar to bridge 9 in construction, save and except that bridge 60 moves as the arms are swung relative to the bridge 9. Bridge 60 includes a tie bar 61 interconnecting a pair of parallel yokes 62 and 63 held spacedly apart by the tie bar. The yokes support posts 64 and 65, each end of a post is provided with a conical bearing seat designated generally as 66, and pivot screws designated generally as 67 are carried at the top and bottom of each yoke for engagement with the conical bearing seats 66 of each post. It will be noted that this structure is the same as shown for the bridge 9 so far as the pivot screws 30 and posts 34 and 35 are concerned. Flattened ends of the arms 1 and 2, as shown at 4 and 5, are connected to the posts 64 and 65 by screws 68 or other means. Intermediate the tie bar 61, and lying transversely thereof along the bottom surface thereof, is a reproducer head 70. The reproducer head has the usual stylus 71 which engages a record track or groove. Also carried by the tie bar 61, is an arm 72 used for lifting and swinging the arms 1 and 2.

It is to be observed that the reproducer head which contains the usual electrical cartridge actuated by the stylus 71 must always have its longitudinal axis in a plane tangent to the record track or groove.

Thus, in movement of the arms 1 and 2, when the stylus of the reproducer head is held within the track or groove of the record, the reproducer head must be so moved or turned by arm movement that the stylus is at all times normal to the record groove. To express this relationship in a slightly different manner, the longitudinal axis of the reproducing head must at all times lie in a plane tangential to the record track or groove.

The arm 2 carries within the same suitable wires 80. One end of the wire is connected to the reproducing head, as shown in FIGURE 1, while the opposite end of said wires connects with the usual speaker system and amplifiers which are not detailed as the practice is common in this regard.

The operation, uses and advantages of the invention are as follows.

Figure 6:
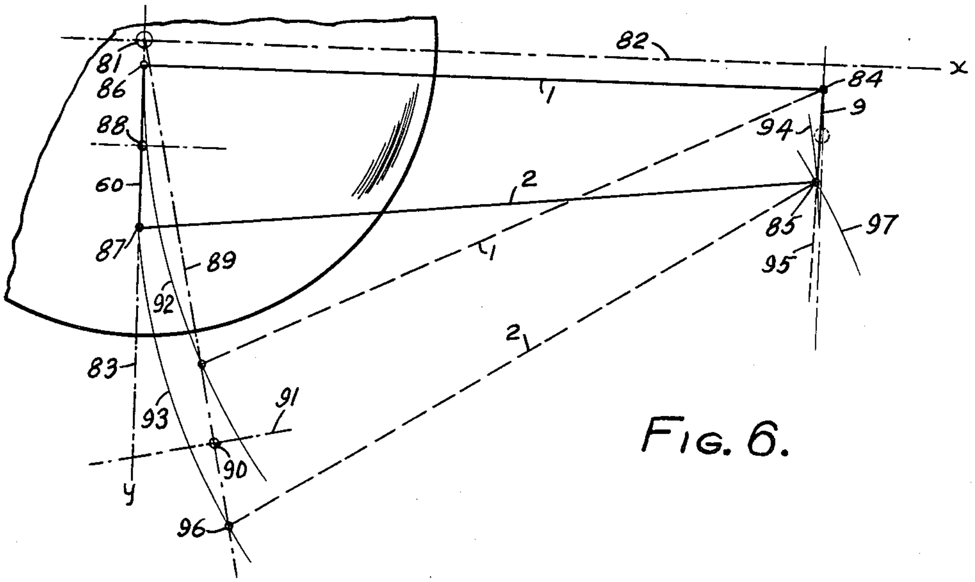
FIGURE 6 is a diagrammatic view geometrically illustrating the principle of the present invention.

In FIGURE 1, it will be observed that the arms 1 and 2 diverge from bridge 9 and that there is a difference between the bridge widths 9 and 60. Upon reference to FIGURE 6, the record turntable 80 has its pin axis at 81. Geometrically speaking, two lines are drawn lying in the plane of the turntable which lines are in right angular relationship, as shown at 82 and 83. If desired, these lines may be termed $x$ and $y$ coordinates. These lines pass through the center of the turntable. The arms 1 and 2 are shown both in full and dotted lines and said arms are of equal length. In the full line position of FIGURE 6, it will be observed that the bridge 9 is in acute angular relationship to line 82 and that bridge 60 lies along line 83. The pivot points for the arms 1 and 2 are indicated at 84, 85, 86 and 87. It will be observed that the arm 1 in full line position of FIGURE 6 parallels the $x$ line 82, and the distance between $x$ line and the axes of arm 1 at 84 and 86 is such that the needle stylus 71 here indicated as being at 88, is at the inner end of the record groove, see dotted line position for the arms 1 and 2 and reproducer head in FIGURE 1. If we draw through the turntable center at 81 a dotted line 89 which is at an angle to the $y$ line 83, the reproducer stylus is at 90. A further line is drawn at 91 which passes through the reproducer stylus position 90 and intersects the $y$ line 83. Lines 89 and 91 are in right angular relationship, and this position will show the position that the reproducer head must lie in order that the stylus will at all times engage the record track or groove in tangent relationship to the track or groove. For convenience we arbitrarily assume that each arm 1 and 2 has the same length and that the length is 14 inches between the pivot points 84 and 86 for arm 1 and 14 inches between pivot points 85 and 87 for arm 2. Arm 1 is swung on an arc from pivot point 84 through the pivot point 86, as shown by the arc line 92. The same is done for pivot point 85 for an arm 14 inches in length which cuts pivot point 87 and forms the arc line 93. It will be observed that the reproducer stylus is at 90 and that the same lies intermediate the arcs 92 and 93. We have chosen the spacing for bridge 60 and particularly the distance between the pivot points as 3⁵⁄₁₆". Hence it is essential to determine the distance between pivot points 84 and 85 using arms which are 14" in length and this is accomplished by swinging an arc line from pivot point 87, as shown at 94, to where the arc line cuts the dotted line passing through and parallel with the plane of the bridge 9 and particularly the pivot points 84 and 85, as shown at 95. Utilizing the same arm 2, particularly where it cuts the dotted line 89 at 96, another 14" arc is swung as shown at 97, and the point where the two arcs 94 and 97 intersect determines the pivot point 85. Thus the distance between points 84 and 85 has been determined with relation to the distance between the pivot points 86 and 87. It will be observed that the pivot points 84 for arm 1 has remained in its position as a stationary point of reference, as is likewise true for the pivot point at 86. The stylus position at 90, as shown in FIGURE 6, is intermediate the arcs and this relationship will be maintained during swing movement of the arms 1 and 2 from the dotted line position into the full line position. The dual arm of my invention, therefore, includes three interrelated simultaneous motions during arm swing which creates two equal circumferential arcs, each of which originates from separate centers spaced a particular distance apart and causing a third motion that travels the difference between the other two motions and forming a linkage between the arcs at a certain calculated distance greater than the distance of the original centers but always proportionate to the dimension given as the radius for both arcs. The angle of approach between the angle of the plane of the third motion and the turntable center at 81 is always zero provided the original centers or stationary double axis maintains the correct angle and distance from the turntable center. Inasmuch as the angle of approach relates only to the turntable center, the diameter of the record is immaterial other than for mathematical conclusions. The distance between pivot points 86 and 87 is known and has previously been given arbitrarily as $3\frac{5}{16}''$, and the distance between pivotal centers 84 and 85 will be found to be $1\frac{7}{8}''$. The stylus of the reproducer head will always be tangent to the record groove as it travels in the record groove. This can be proved mathematically, as well as by the method shown in FIGURE 6. For any other desired reproducer arm length, simple mathematical proportion may be utilized, as for instance for 10″ arms the bridge pivots would be separated; viz $14:3\frac{5}{16}::10:x$
$14:1\frac{7}{8}::10:x$
$x=2.3660$ for bridge 60
$x=1.3392$ for bridge 9

From an actual standpoint, I have found that a 14″ arm is recommended for all records up to 12″ or over while shorter length arms may be used for all records with diameters of 12″ or less, such as, for instance, 12″ arms.

The arms 1 and 2 are so balanced by turning the weights 47 and 48 on the screw threaded members 46 that the pressure of the stylus on the record groove can be very light or heavy as desired. However, the present construction is such as to allow a light tracking pressure which will not wear the groove unduly. If the turntable is horizontal and level as is likewise the base 7 which is fastened to the foundation member by screws or otherwise, it will be found that the torque influence, when the stylus is placed upon a smooth surface, to wit, a record without grooves, is zero. Most tone arms have a tendency to move toward record center, but with the present construction and proper balance, the stylus will neither move inwardly or outwardly on the smooth surface.

I claim:

1. A tone arm mechanism for use in the reproduction of sounds from a record of the disk type positioned on a turntable having a center, including: first and second tone arms of equal length respectively pivoted at fixed pivot points spaced from the center of said turntable and at a given distance apart so that said tone arms can execute angular motion about said points over the surface of said turntable; link means pivoted to the free ends of said tone arms to hold said free ends at a spaced distance apart greater than said given distance; a reproducer head having a stylus carried by said link means in a position such that said stylus is located at the mid-point of a straight line drawn between the pivotal sections of the free ends of said arms so as to be equi-distant from said pivotal connections, the length of said arms and the difference between said given distance and the greater distance between said pivotal connections at the free ends of said arms being such that said straight line drawn between said pivotal connections is always parallel to a radius of said turn-table drawn from its center through the point of engagement of said stylus with a record placed on said turntable.

2. A tone arm mechanism according to claim 1, in which if there are assumed $x$ and $y$ rectangular axes with the origin at said turntable center, the axis of said first arm is parallel to the $x$ axis in one position and the axis of said second arm is non-parallel to said $x$ axis, a straight line drawn through said fixed pivot points forming an angle to a line parallel to the $y$ axis, the arc followed by said stylus when said first and second arms angularly swing about said fixed pivot points lying intermediate the arcs followed by the pivotal connections at the free ends of said arms, the angle of approach between the arc followed by said stylus and the center of said turntable being zero, whereby said stylus moves tangent to the record track for different radii.

3. A tone arm mechanism according to claim 1, in which the ratio of said given distance to the length of said tone arms is 1.8750 to 14.0000 and the ratio of said greater distance to the length of said tone arms is 3.3125 to 14.0000.

References Cited by the Examiner

FOREIGN PATENTS

| | | |
|---|---|---|
| 666,928 | 3/1931 | France. |
| 361,285 | 11/1931 | Great Britain. |
| 386,851 | 1/1933 | Great Britain. |

LOUIS J. CAPOZI, *Primary Examiner.*
ARNOLD RUEGG, *Examiner.*